United States Patent [19]
Krohn et al.

[11] 3,717,141
[45] Feb. 20, 1973

[54] SYSTEM FOR PROVIDING A MULTI-LEVEL CURRENT DENSITY DIAGRAM OF A HUMAN BODY ORGAN

[75] Inventors: Lawrence H. Krohn, 905 Robin Rd., Ann Arbor, Mich. 48103; Angelo L. Merlo, Troy, Mich.

[73] Assignee: said Krohn, by said Merlo

[22] Filed: Sept. 15, 1970

[21] Appl. No.: 72,432

[52] U.S. Cl............................128/2.06 R, 128/2.06 E
[51] Int. Cl. ..................................................A61b 5/04
[58] Field of Search........128/2.06 B, 2.06 E, 2.06 G, 128/2.06 R, 2.06 V, 2.1 E, 2.1 R

[56] References Cited

UNITED STATES PATENTS

| | | | |
|---|---|---|---|
| 3,516,400 | 6/1970 | Kruhn et al. | 128/2.1 R |
| 3,409,007 | 11/1968 | Fuller | 128/2.06 E |
| 3,294,084 | 12/1966 | Schuler et al. | 128/2.06 E |
| 3,434,151 | 3/1969 | Bader et al. | 128/2.06 R |

*Primary Examiner*—William E. Kamm
*Attorney*—Whittemore, Hulbert & Belknap

[57] ABSTRACT

The system includes means for obtaining potential signals from discrete locations on the skin surface surrounding the organ in question. These signals, which are analog in nature, are converted to digital form and recorded. This digital information is then fed to a digital computer wherein the computer converts the recorded digital data into a series of multi-level current density diagrams. These diagrams represent functioning of the organ and may be compared, either automatically or visually, with corresponding diagrams of normal organ operation to facilitate medical diagnosis of the organ in question. Means are also provided to display the digital information in analog form.

34 Claims, 16 Drawing Figures

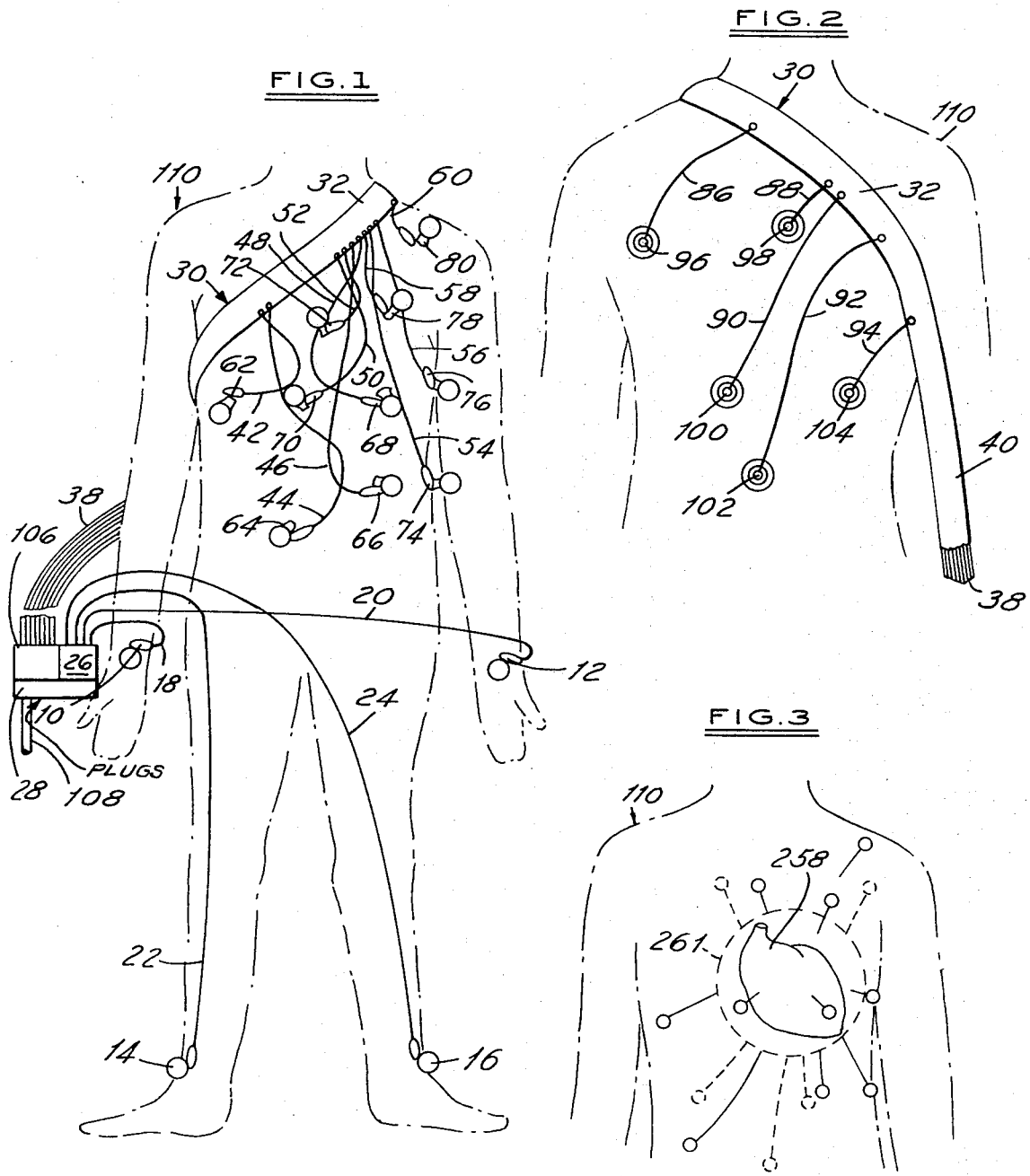

NORMAL
RT. ANTERIOR LEFT    POSTERIOR RT.

260                                    262

CORONARY ARTERIOSCLEROSIS
RT. ANTERIOR LEFT    POSTERIOR RT.

264                                    266

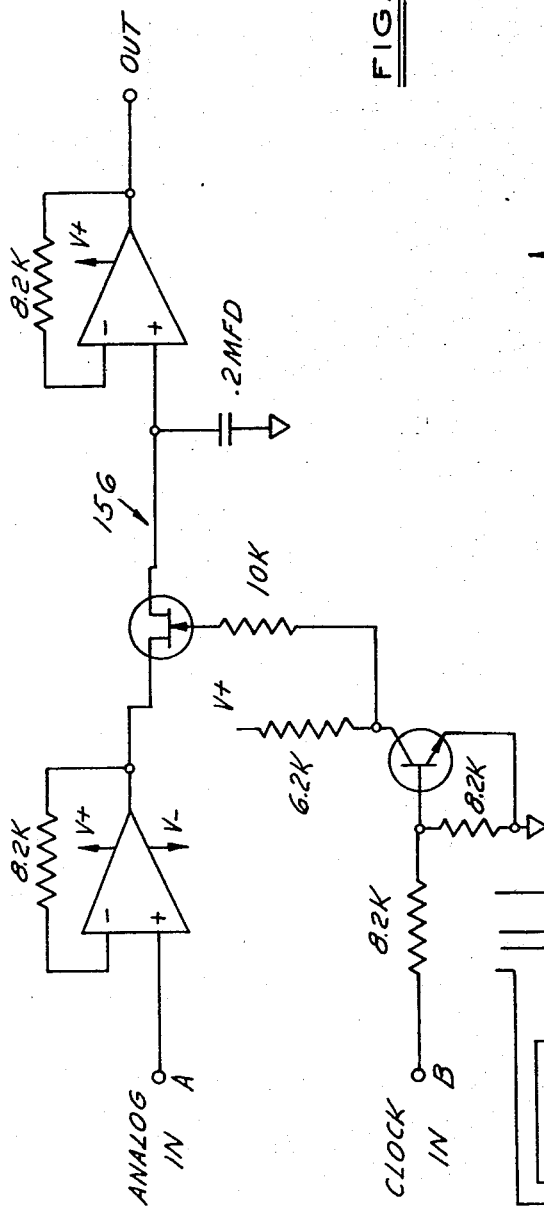
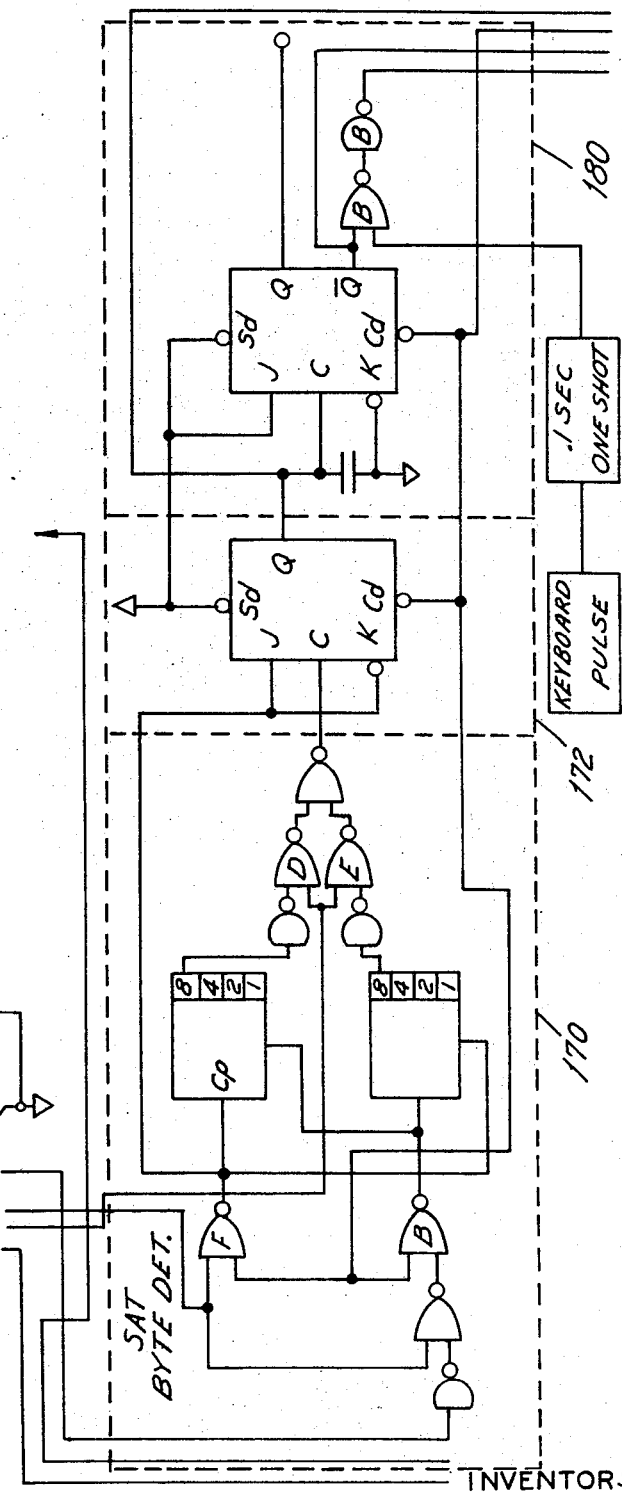
FIG.16

SYSTEM FOR PROVIDING A MULTI-LEVEL CURRENT DENSITY DIAGRAM OF A HUMAN BODY ORGAN

BACKGROUND OF THE INVENTION

The specific embodiment of the invention disclosed relates to electrocardiography. However, the invention is also applicable to medical examination of other body organs such as the brain.

Contraction and relaxation of muscle tissue are accompanied by electrical activity associated with movement of ions across cell membranes during these processes. Because body tissues conduct electricity, these cellular current sources produce current throughout the body. Potential differences of the order of millivolts are commonly detected at the body surface from the action of the heart muscle. Electrocardiograms are records of these potential differences which arise from the beating of the heart. Conventional electrocardiography is the art of interpreting heart action in terms of the changing pattern of electrical potential on the body which always accompanies heart activity.

In conventional electrocardiography, diagnosis of even gross cardiac faults results in the diagnostician being wrong several percent of the time because conventional electrocardiography utilizes only a fraction of available electrical information. It is virtually impossible, in many cases, by means of conventional electrocardiography to recognize minor heart damage. Further, it is difficult to pinpoint the location of the damage, even when the damage is gross.

In accordance with the present invention, conventional electrocardiography has been improved by providing means for integrating the information received by a plurality of electrodes into a single representation as opposed to the examination of discrete signals as has been common in the past. Further, the signals are converted from voltage representations to current density representations thus permitting examination of the current density activity associated with the heart. This activity is more representative of heart action than are voltage representations.

In testing of a number of patients with the present system, heart damage, which was not detectable by conventional ECG methods, was detected in some patients. The information obtained by the present invention was subsequently confirmed by later developing ECG changes, angiography and autopsy findings.

A further advantage of the invention is that the mechanism for digitally recording information from a patient is inexpensive enough and small enough in size to be used in a physician's office. Thus, the patient may have the testing accomplished by his regular physician. This enables the physician to make an examination when he feels such is called for. The information taken by the physician may subsequently be analyzed in a digital computer located remotely from his office. The computer time involved is relatively short, thus the expense to the patient is within a normal budget.

One example of the advantage of the invention may be appreciated from a series of tests conducted to evaluate the invention. These tests were made on a group of Detroit firemen. Firemen are subject to heart attacks in the line of duty. This results from the nature of the work, that is, exposure to sudden strenuous activity and smoke. It was learned as a result of the tests that certain of the firemen should be relieved of active fire-fighting duty. This was done. Subsequently, it was learned that these firemen did, in fact, have heart damage which if they had continued to work in active firefighting, may well have caused serious physical disability.

SUMMARY OF THE INVENTION

The system for providing a multi-level current density diagram of a human body organ for the purpose of medical diagnosis includes means for attaching a plurality of electrodes to a patient's body in positions around the organ to detect continuous analog-type voltage signals resulting from electrical energy generated by the organ in the course of its functioning. Digital converting and recording apparatus are connected to the electrodes. This apparatus includes means to multiplex a discrete portion of the signals, means to convert the multiplexed portion into digital form representing the magnitude thereof and means to record the signals in digital form. Digital computer means are then used to convert the recorded digital data into a series of multi-level current density diagrams. The computer is preset with respect to the time intervals of discrete portions of the recorded data and with respect to the correlative geometrical locations of the electrodes and with respect to the resistivity of the body parts between the electrodes and the organ to convert the voltage representations to current density representations. Finally, comparative means are provided for comparing the diagrams of normal organ functioning for medical diagnosis thereof. The system also includes display means which may be connected to the output of the recording means. The display means are operative to convert the digital information of the recorder means to analog information and display this information in analog fashion. In the drawings:

FIG. 1 is a front view of a patient with the electrode harness of the present invention mounted in place;

FIG. 2 is a rear view of the patient illustrating the installation of the harness from the rear side;

FIG. 3 is a diagrammatic view of a patient illustrating the correlation between the signals picked up on the skin surface by means of the electrodes and the signal source which is the heart of the patient;

FIGS. 14–16 illustrate specific details of non-conventional circuitry utilized in the invention.

DESCRIPTION OF A PREFERRED EMBODIMENT OF THE INVENTION

Figure 4:
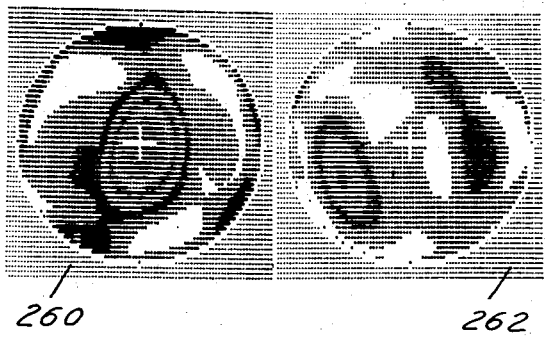
FIG. 4 is a current density diagram illustrating functioning of a healthy heart.

Referring first to FIGS. 1 and 2, the electrode system for obtaining the desired signals for a patient 110 is illustrated. Two sets of signals are taken from the patient 110. One set of signals represents a standard electrocardiographic system. This set of systems is utilized in the invention as a base voltage reference point. These signals may also be concurrently utilized with the present invention for conducting a standard electrocardiographic analysis.

The standard ECG signals are obtained by means of electrodes 10, 12, 14, 16 which are attached, respectively, to the right inner wrist adjacent the palm, the left inner wrist adjacent the palm, the right ankle adjacent the instep and the left ankle adjacent the instep. Conductors 18, 20 22, 24 extend from the electrodes to a plug 26. The plug 26 is receivable in a socket 28.

Signals for direct use in accordance with the invention are obtained by means of an electrode harness device 30 which includes a belt 32 which is fastened to the patient over the left shoulder and under the right arm.

The belt 32 is a hollow flexible tube and contains a plurality of shielded electrical conductors which form a cable 38 extending from branch portion 40 of the belt. Ten of the shielded conductors 42, 44, 46, 48, 50, 52, 54, 56, 58, 60 extend from the front portion of the belt at spaced apart location on the thorax. Each of the conductors terminate in an electrode 62, 64, 66, 68, 70, 72, 74, 76, 78, 80. These electrodes each include a suction cup device which is removably attached to the skin to make electrical contact therewith. The electrodes are spaced around the thorax region of the patient 110 at locations which will result in relevant electrical signals. As shown in FIG. 2, five of the shielded electrical conductors 86, 88, 90, 92, 94 extend from the rear portion of the belt 32 at spaced apart locations. Each of these conductors terminates in an electrode 96, 98, 100, 102, 104. These electrodes are adhesive discs to facilitate patient comfort when the patient is lying on his back during the testing procedure. The posterior electrodes are also spaced at discrete locations which will result in relevant electrical signals concerning the heart.

The cable 38 terminates in a plug 106 which is also received in the socket 28. A cable 108 extends from the socket 28 into connection with the electrical apparatus of the invention. The socket 28 may be located remotely from the device whereby the patient may be tested in a room remote from the actual electrical apparatus. The patient may also have the belt 32 installed remotely from socket 28 permitting many patients to be quickly connected to socket 28.

Figure 6:
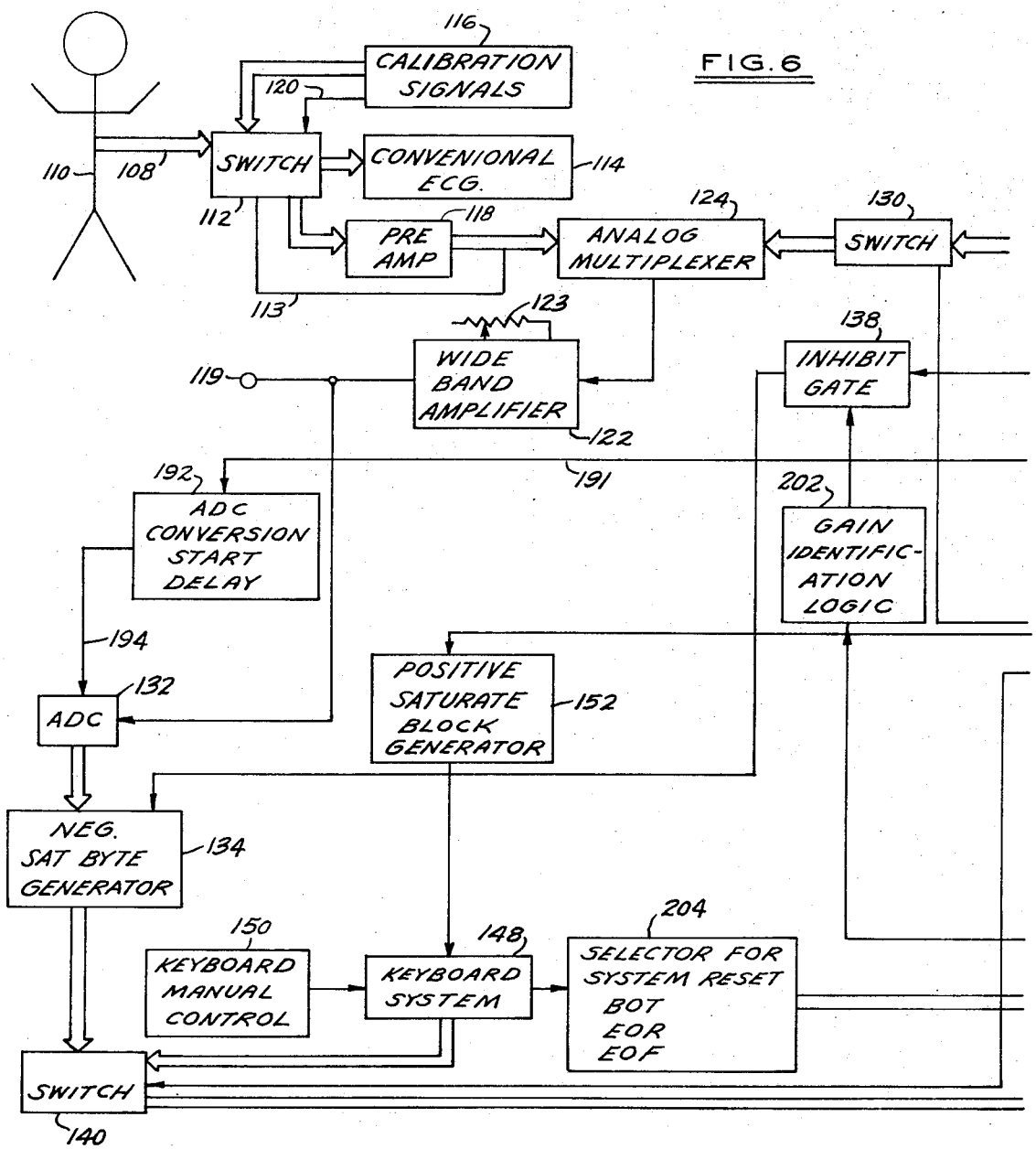
FIG. 6 is a portion of a block diagram illustrating the system for digital data recording, reading and display in accordance with one embodiment of the invention.
Figure 7:
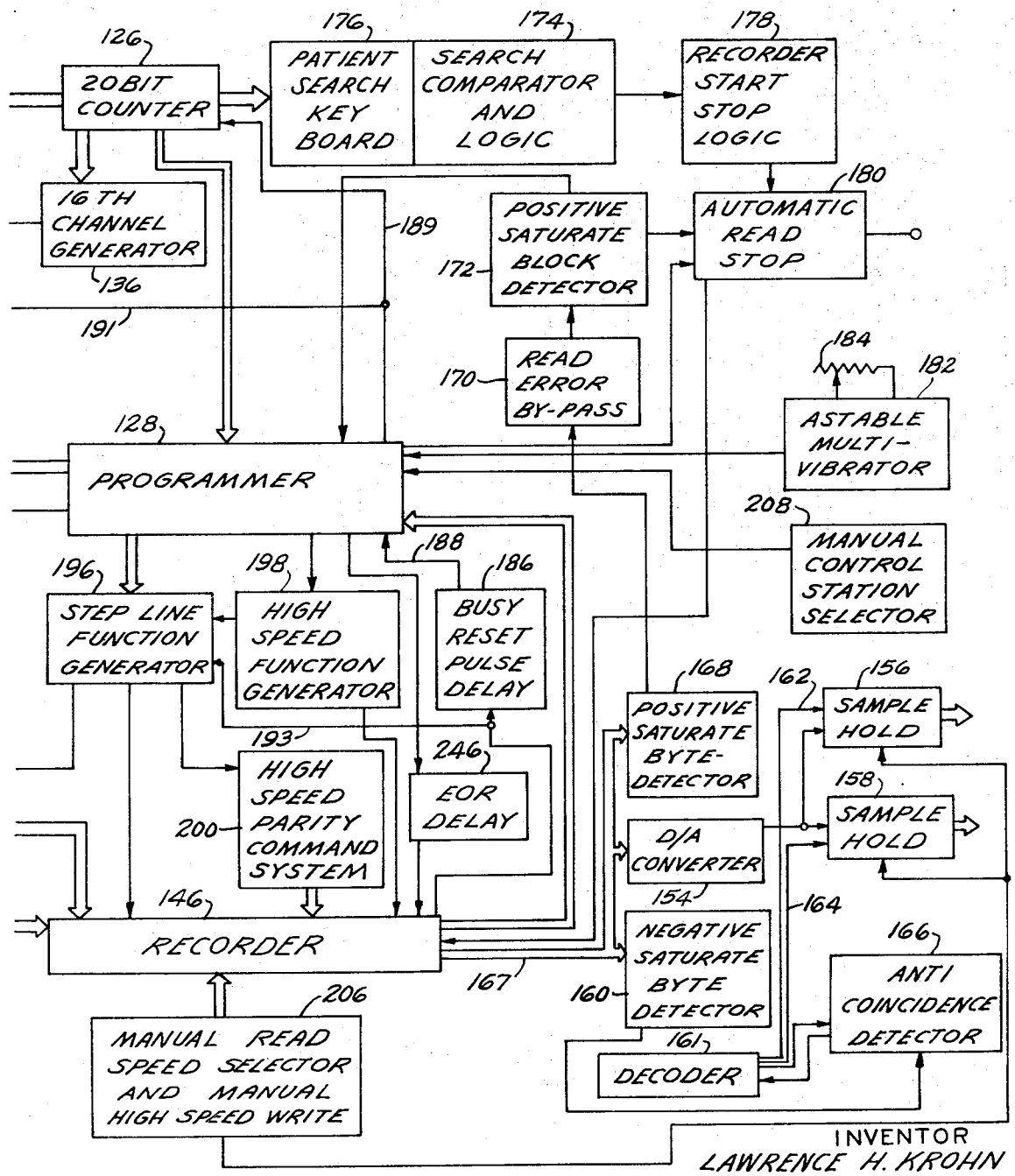
FIG. 7 is the remaining portion of the block diagram of FIG. 6.

FIGS. 6 and 7 illustrate the overall system for digital recording of the data relating to the heart signals emanating from the patient 110 and reading and displaying the signals in a fashion to give information leading to a medical diagnosis. The cable 108 leading from the patient electrodes is connected to a three-position selector switch 112 which includes switching mechanism capable of handling the nineteen signals from the patient and manipulating these signals for further processing. In one position, the switch 112 will divert the signals emanating from electrodes 10, 12, 14, 16 and 44 to a conventional ECG apparatus 114 to thereby facilitate a standard ECG medical analysis.

In another position, all nineteen incoming signals are sent to the mechanism of the invention. In this position, the fifteen signals obtained from the electrodes of the cable 38 are amplified by means of a two-stage amplifier structure. Each signal is individually amplified by means of a separate amplifying device. Three of the signals (10, 12, 16) are utilized in a connection known as the Wilson central terminal. Each of the signals is first reduced in intensity by means of a resistive network. The thus modified signals are then added together and form a base voltage which is utilized as a base voltage in a differential amplifier to permit amplification of the difference between the so established base voltage and each one of the group of 15 signals.

In the final position of the selector switch 112 fifteen independent arbitrary calibration signals are sent from a signal generating device 116 into the overall system. These signals are utilized along with a ground to adjust the gain of the various amplifiers.

The 15 amplified electrode signals are fed from the pre-amplifying device 118 and a sixteenth signal obtained from the signal generating device 116 via lead 120, switch 112 and lead 113 is joined thereto. This signal may be used as a reference level voltage in gain calibration of the wide band amplifier 122. The fifteen low impedance signals obtained from the pre-amplification stage 118 and the signal obtained via lead 120 are sent into a sixteen channel analog multiplexer 124. The multiplexer 124 is indexed by means of a twenty bit counter 126. The counter can be controlled by means of three different devices in the system. Each device is utilized at a different stage of manipulation of the signals. The manipulation is determined by means of a hard-wire programmer 128. The programmer 128 includes eleven different positions which are consecutively sequenced during one cycle of operation of the programmer. A relay-type switch 130 is interposed between the counter 126 and multiplexer 124. The switch 130 functions to feed the first four bits of the counter 126 to the multiplexer for indexing of the multiplexer.

The output signals from the multiplexer are fed to the wide band operational amplifier 122 which is of the feedback type to control the output thereof. In operation of amplifier 122, the input signal increases. Additionally, zener diode means are provided at the output of the amplifier to limit, in one actual embodiment, the output of the amplifier to plus or minus 9.8 volts. A manual gain control 123 is provided for the amplifier 122.

The signals which emanate from the amplifier 122 are fed to an analog to digital converter 132. The converter 132 changes the analog input signals to the complementary digital form which represents digitally the counter delay 186. This delay is provided to synchronize the operation of the analog to digital converter with the recorder data storage time. The thus delayed signal is taken from the recorder via lead 188 and sent to the counter 126 via the programmer lead 189 to thereby control the operation of the counter. Another lead 191 extends from lead 189 and is connected to a second delay mechanism 192. Lead 194 extends from the delay mechanism 192 to the A/D converter 132. A step line function generator 196 is connected to lead 188 by lead 193.

As will be appreciated, when the electrodes are attached to the patient 110 and the switch 112 set to pass signals for amplification and multiplexing, the signals are constantly fed into the converter 132. The information contained in these signals is only recorded when the busy reset signal is received by the converter 132. The presence of this signal causes energization of the converter and the absence of the signal causes de-energization of the converter. The time delay is provided so that the converter will perform conversions in step with multiplexing.

During the recording of this information, means are provided to automatically cause recording of the information in two blocks each of 32,600 bytes of information. This corresponds to information from four heart beats. Means are also provided to automatically provide parity marks at the end of each block of information and to automatically cause the recorder to stop at the end of the recording of the information. These means include the step-line function generator 196, a high speed function generator 198, a high speed parity command system 200 and a gain identification logic circuit 202. The step-line function generator 196 controls the high speed stepping action of the recorder during recording of the fifteen signals. The high speed function generator 198 functions as a switching device for the recorder 146. A manual programmer indexing device 208 is provided for manipulation of the programmer 128.

A more detailed description of the system will follow hereafter. The heart of the system is the programmer 128. Physically, this programmer is a multi-position switch having a plurality of poles at each station of the switch. There are eleven stations in the programmer and each station includes twelve poles. The poles provide for interconnecting the various circuits and devices previously described. Each station represents one step in the cycle of operation of the overall system. A control panel may be provided having a plurality of lamps each one corresponding to one station wherein the appropriate lamp is energized at its corresponding station to thereby visually indicate to the operator the particular station which is energized. In one embodiment, the manual programmer indexer 208 is capable only of permitting sequenced operation of the programmer, that is, movement from one to eleven without skipping or backing up during a cycle. Movement from station to station may be controlled by a manually depressable switch. The operator may cause the programmer to remain at a given station as long as desired.

Figure 8:
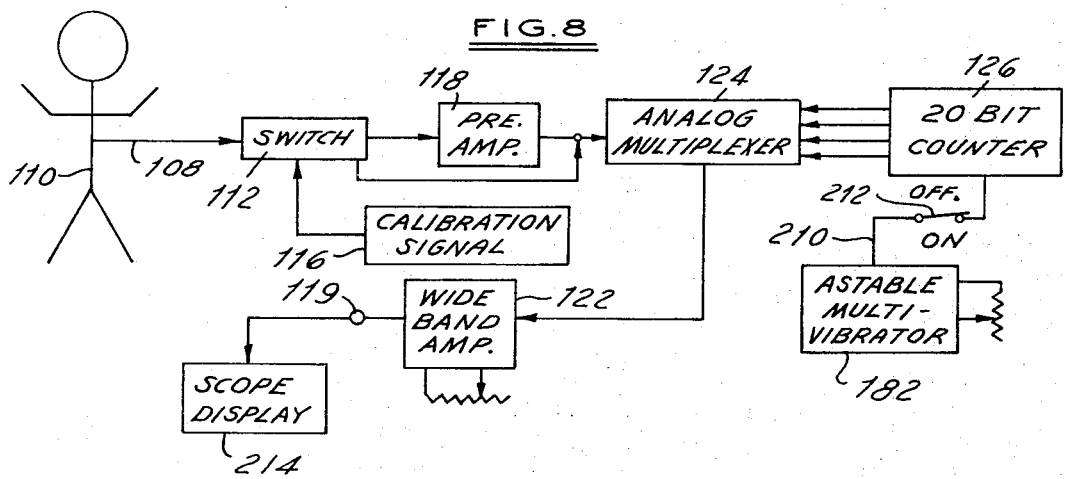
FIG. 8 is a block diagram illustrating utilization of the system of FIGS. 6 and 7 for patient lead scan.

FIG. 8 illustrates the means for examining the electrical connections made by the leads on the patient. This is referred to as "patient lead scan." Patient lead scan may be accomplished at both stations one and seven of the programmer.

In stations one and seven, the astable multivibrator 182 is connected to the 20 bit counter 126 via lead 210. An on-off switch 212 is provided in lead 210 to permit connecting or disconnecting the vibrator from the counter. The counter 126 is connected to the multiplexer 124 as previously described. The 15 leads contained in cable 108 and connected to the patient 110 are routed through the switch 112 to the pre-amplifier 118 and thence to the multiplexer 124 and the calibrated signal from device 116 is routed by the switch 112 around the pre-amplifier and directly into the multiplexer all as previously described. The output of the multiplexer is fed to the wide band amplifier 122. A connection is made manually to the output 119 of the wide band amplifier to feed the output of the amplifier into an oscilloscope 214. During this step, the operator may observe the signal emanating from each of the fifteen leads and the signal from the calibration device 116 in sequence. Poor electrode contacts may be identified by an increase in the 60 Hertz background noise. This identification may be made by a mental comparison to a standard good connection. When an electrode having a poor contact is recognized, the particular electrode may be located by simultaneously observing the scope and touching each individual electrode. When electrodes are touched, there will be an increase in the 60 Hertz background as a result of the antennae effect of the body of the person touching the electrode. This will be displayed in the scope and when the operator touches the lead having the poor connection he will then know which lead is affected. Corrective action may then be taken.

As previously discussed, the vibrator 182 provides a clock-like pulse to the counter 126 thereby controlling the counting rate. This rate determines the length of time that a specific signal will be displayed on the scope 214. The frequency of the vibrator may be varied manually by means of the potentiometer 184 during the scanning operation to shorten or lengthen the time which the signals are displayed. For example, in one embodiment the dwell time was variable from one to 15 seconds. If it is desired to display a signal for longer than 15 seconds, the switch 212 may be opened whereupon the displayed signal will continue to be displayed on the oscilloscope until closure of the switch 212.

Figure 9:
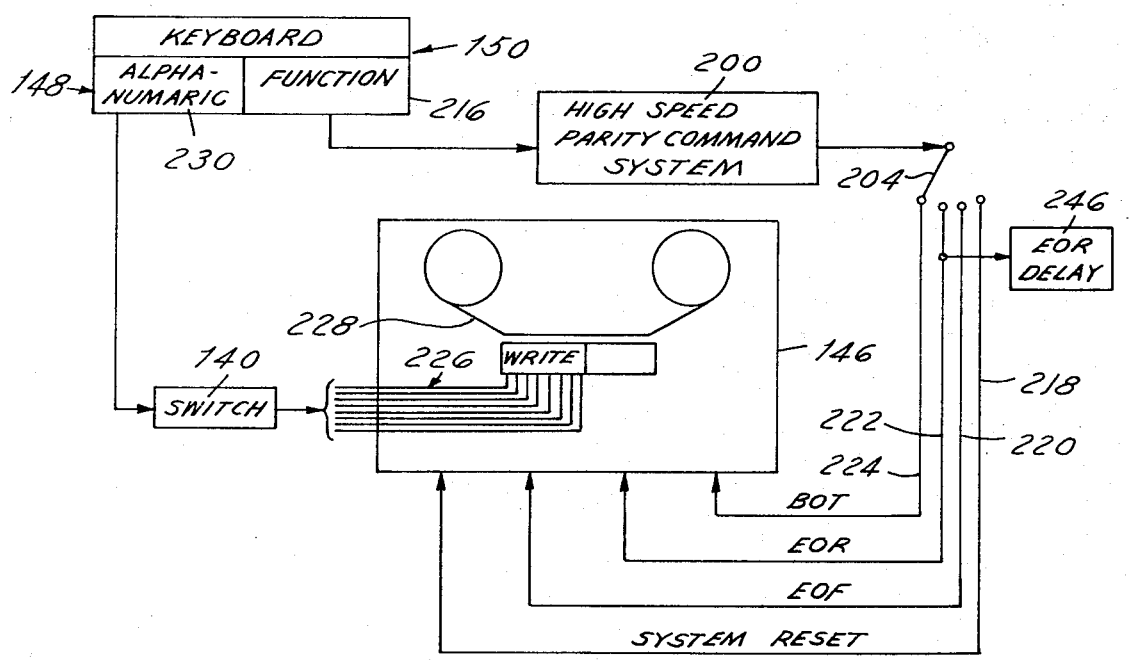
FIG. 9 is a block diagram illustrating utilization of the system of FIGS. 6 and 7 for recording information relating to patient identification and computer functions.

FIG. 9 represents the connections made by the programmer in stations two, five and nine. Stations two and nine may be referred to, respectively, as the pre-manual station and the post-manual station. In these stations, the system is connected to permit manual recording of function characteristics. In station five, the system is connected to permit manual recording of information, more specifically, information concerning patient identification.

In stations two and nine, the keyboard network 148, which has an output 216 activated by a key of the manual keyboard 150, is connected via this output to the high speed parity command circuit 200 and thence to the selector switch 204. The circuit 200 functions to provide a short time delay between depression of the function key and reception of the signal at switch 204. The switch 204 is a four-position switch and has four magnitude of each signal and the sign of the signal in an eight bit byte. The output of the A/D converter is fed to a negative saturate byte generator 134. Every 16th signal, which is the single calibration signal originally fed into the system, is caused to actuate the device 134 and cause it to generate a negative saturate byte. This negative saturate byte is employed as a key to de-multiplexing during the reading of previously recorded data as will be apparent from the description which follows. The sequence of 15 signals following the negative saturate byte which represent the fifteen electrode signals in digital form are passed through the generator 134 undisturbed.

The means for activating the negative saturate byte generator 134 every sixteenth count comprises a 16th channel generator device 136 which is controlled by the first four bits of the twenty bit counter 126 and is caused to pass a signal upon the fall of every 16th count. This signal passes through an inhibit gate 138 and is connected to the negative saturate byte generator 134. The presence of the gate 138 does not affect the functioning of the device 136. This gate is utilized at a later stage of the overall cycle.

The output of the generator 134 is supplied to a switching mechanism 140 which includes a relay which is actuated by the programmer 128 to one or the other of two positions. In one position, the output of the A/D converter is fed to the write lines of a tape recorder 146. In the other position, the switch 140 connects a keyboard system 148 to the write lines of the tape recorder. The keyboard system 148 is manually operated by means of a keyboard manual control 150. The keyboard system may be manipulated by a positive saturate block generator 152 to cause the keyboard system to have a positive saturate byte to be ultimately utilized for patient identification purposes.

Circuitry is provided for direct read-out from the recorder. The read-out may occur simultaneously with recording or it may be accomplished subsequent to recording. The read-out is accomplished by converting the digital information in the recorder to analog information. Read lines 167 extend from the recorder 146 to a digital to analog converter 154. Means are provided for selectively examining any two of the fifteen different signals simultaneously. These means include a pair of sample hold circuits 156, 158. These circuits are each capable of sampling the entire output of the converter 154 one electrode channel at a time and holding this signal for display purposes a length of time to permit transmission of the byte of the succeeding cycle of information which is being examined. The negative saturate byte which was inserted by the generator 134 is utilized at this point as a base reference to permit counting up to the desired byte of information.

The information from the read lines of the recorder is also fed to a negative saturate byte detector 160 which detects the negative saturate byte and relays this information to a decoding network 161 to regulate counting of the network. The decoding network is manually set to the desired byte of information which is to be passed through the sample hold circuits each cycle. As will be noted, two leads 162, 164 extend from the decoding network to permit operation of both of the sample hold circuits. Errors in counting which may be caused by reception of a random negative saturate byte are prevented from causing error by an anti-coincidence detector 166 which is connected to the decoding network 161. In the event such a random negative saturate byte is received, the detector 166 will recognize that an error has occurred and will restart counting upon reception of the next regular negative saturate byte. The output of the sample hold circuits may be displayed, for example, on an oscilloscope or pen recorder.

Means are provided for searching previously recorded information to locate the data concerning a particular patient. The read lines 167 of the recorder are connected to a positive saturate byte detector 168. The positive saturate bytes which were inserted by means of the positive saturate block generator 152 are detected by the positive saturate byte detector 168. The detector 168 emits a pulse each time a positive saturate byte passes the read head of the recorder. These pulses are fed to a read error by-pass circuit 170. This circuit detects the presence of random positive saturate bytes and prevents the next stage positive saturate block detector 172 from indicating the presence of a positive saturate block when in fact only a random positive saturate byte has been received. When a positive saturate byte is received, the detector 172 feeds this information via switching mechanism in the programmer 128 to the 20 bit counter 126. The counter 126 then begins to count and results of the count are fed to a search comparator and logic circuit 174. The data concerning each patient is assigned a number when that information is recorded. This number is inserted into a patient search keyboard circuit 176. The circuits 174, 176 are integrated and together form a logic circuit which, when the proper patient number is counted out, will emit a signal which is connected to the recorder start-stop logic circuit 178. This circuit has been previously energized and is de-energized upon reception of the signal. The circuit 178 which is connected to the recorder via automatic read stop 180 then causes the recorder to stop.

An Astable multi-vibrator 182 is provided. The vibrator 182 is connected to the programmer 128. The output of the vibrator is utilized during placement of the positive saturate block, and during a test procedure involving scanning of the leads to be sure that a good electrical connection has been made. The vibrator 182 is provided with a potentiometer 184 to vary the frequency of the vibrator during scanning of leads to slow the scanning process down and facilitate visual inspection. The vibrator accomplishes its function by controlling the counter 126.

Additional means are provided to control the counter 126 during the actual recording of the 15 signals. The recorder 146 includes means for providing an optics signal correlated to the speed of the tape in the recorder. This signal is derived from the capstan which mechanically drives the tape. The device for producing this signal converts it to an electrical signal which is the actual signal taken from the recorder. The reason for using such a signal is that during recording of this data, the recorder itself becomes the control mechanism and determines the rate at which information may be recorded. The signal source in the recorder is termed a "busy reset." The signal from the busy reset is sent from the recorder through a busy reset pulse leads 218, 220, 222, 224 extending therefrom. These leads are connected to the recorder and, internally of the recorder, are connected to recorder mechanism for providing, for example, a BOT, EOR, or EOF character and a system reset. The internal mechanism of the recorder connects each of these leads to the eight write lines 226 which cause recording of the proper byte onto the tape 228. The desired character is selected prior to depression of the function key whereupon the function key is depressed and then the character is recorded and the tape stepped to the next position.

In station five, the alphanumeric network 230 is connected to the write lines 226 of the recorder via the relay switch 140. The relay switch 140 is energized by the programmer. The alphanumeric keys may then be utilized to record the proper information onto the tape 228. The switch 140 is also energized at other stations, namely, stations two, three, four, five, nine and eleven when it is desired to disconnect the A/D converter from the recorder.

Figure 10:
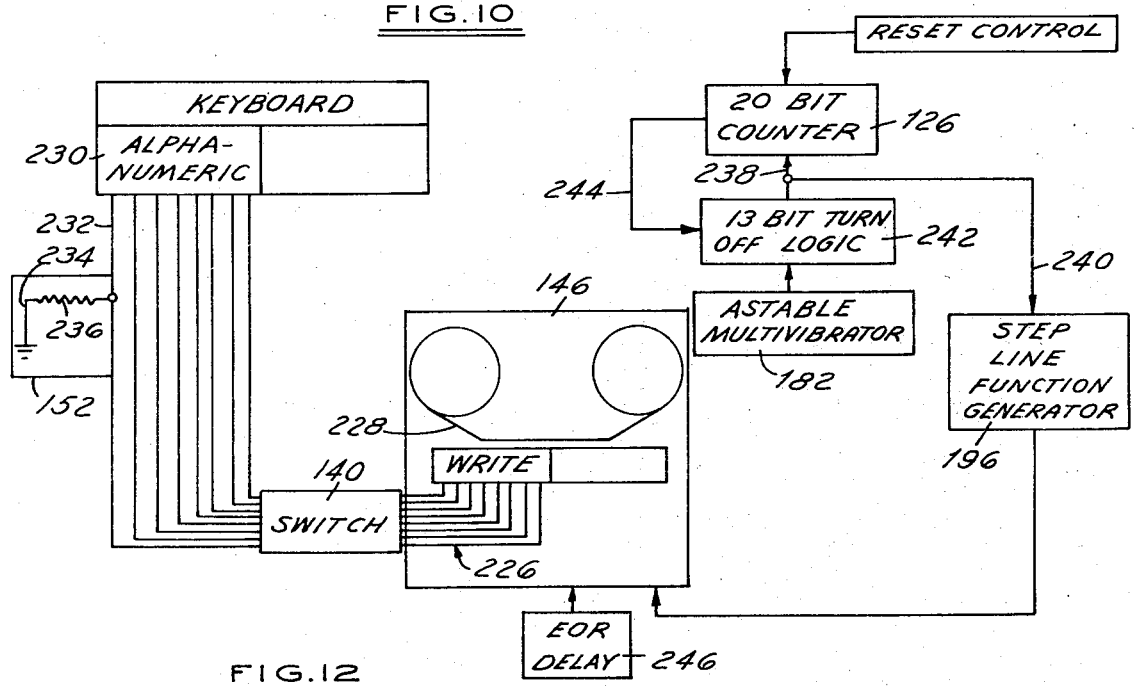
FIG. 10 is a diagram similar to FIG. 9 illustrating recording of a positive saturate block.

When the programmer is advanced to station three, as illustrated in FIG. 10, a positive saturate block is recorded. The function of this positive saturate block is to provide means for indicating the location of each individual patient record on the tape. On a given tape, these blocks are identified numerically with the numbers being correlated to a manually written log. Consequently, by relating the patient's number on the log to the number of a saturate block which may be counted in the system, the record of the patient may be located.

In station three, the switch 140 again connects the alphanumeric portion 230 of the keyboard system to the write lines 226 of the recorder. The programmer causes one of the leads 232 of the write lines extending from the keyboard to be grounded by means of the positive saturate block generator 152. The ground lead 234 includes a load resistor 236. The lead 232 which is grounded comprises the most significant bit of the logic emanating from the keyboard system. The keyboard system code is in inverted logic, that is, a logic zero is represented by a high on the keyboard. Consequently, the recorder receives all logic ones except the most significant bit with the consequence that each byte recorded will be positive and will be saturate.

Recording of the positive saturate bytes in the recorder is controlled by the astable multi-vibrator 182, the counter 126 and the step-line function generator 196. As will be noted, the output of the vibrator 182 is connected to the counter 126 via lead 238. The output is also connected to the generator 196 via lead 240. The vibrator pulses at a pre-selected frequency at this point, the potentiometer 184 being disconnected by means of the programmer. Representatively, the vibrator may pulse at a rate of 550 Hertz.

The step-line function generator 196 causes the recorder 146 to step at the rate of the vibrator 182 thus recording the saturate bytes at this rate. The vibrator 182 which controls the rate of counting of the counter 126, causes the counter to also count at the rate of 550 Hertz. A thirteen bit turn-off logic circuit 242 is interposed between the output of the vibrator 182 and the counter 126 and generator 196. A lead 244 extends from the thirteenth bit of the counter. When the thirteenth bit is reached in the counting process, a signal is applied to the logic circuit 242 which, along with the signal from the vibrator 182, causes the cessation of signals from the vibrator to the counter and to the generator. Consequently, both counting and stepping cease at this point. This results in a positive saturate block of 4096 bytes.

Referring again to FIGS. 9 and 10, when the programmer is advanced to either stations 4 or 6, an EOR gap is automatically recorded. The function of this gap is to separate the information recorded at station three from that recorded at station five and to separate the information recorded at station five from the information recorded at station eight.

The means for automatically injecting the EOR gap are set up at the preceding stages, namely, stations three and five. An EOR delay circuit 246 is energized by the programmer at stations three and five. The circuit 246 is capable of applying a signal to the EOR input of the recorder 146. Upon movement from either stations three to four or stations five to six, the circuit 246 is actuated to provide the signal simultaneously with the switching action to accurately record the parity mark and gap on the tape.

Figure 11:
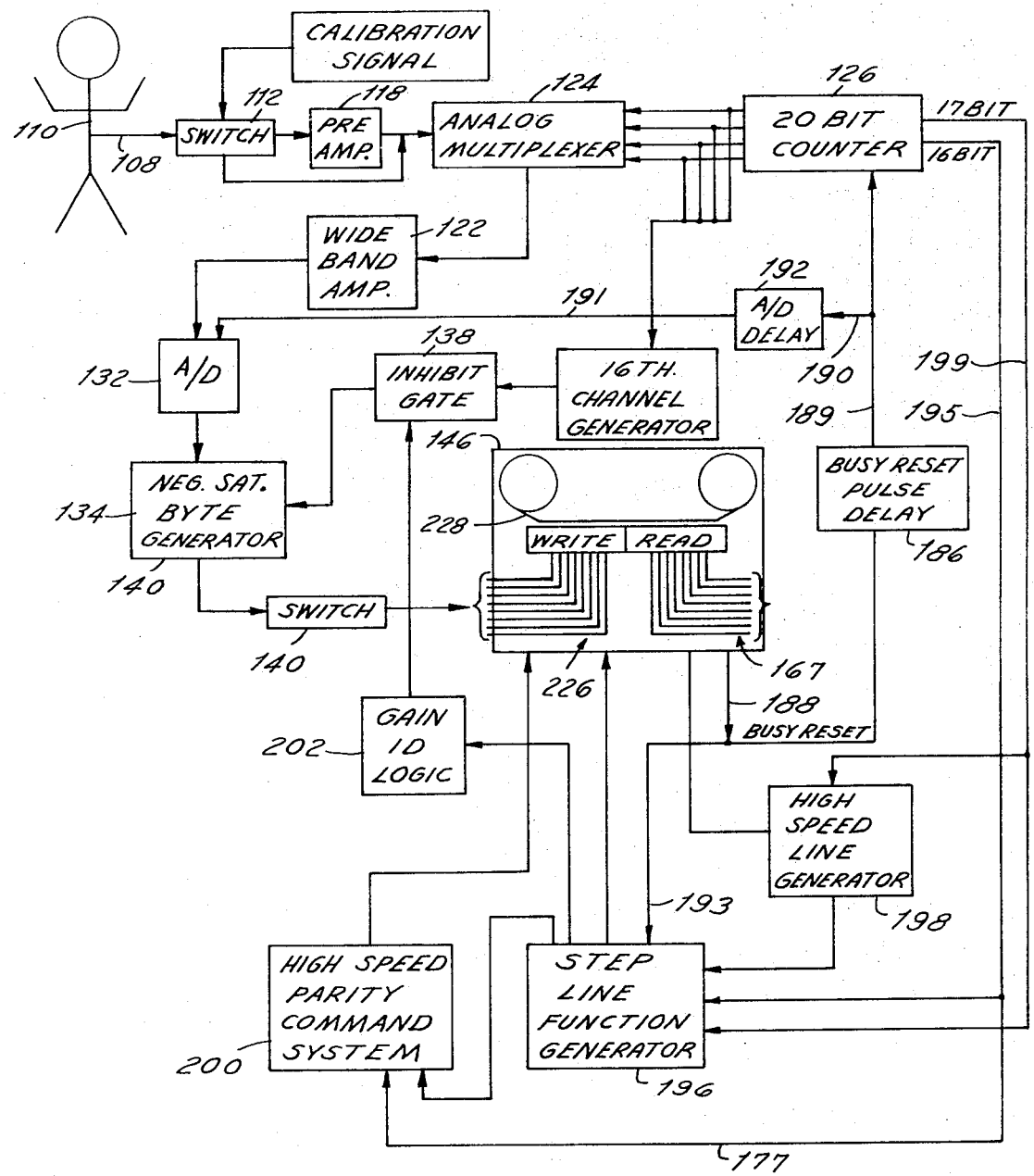
FIG. 11 is a block diagram illustrating utilization of the system of FIGS. 6 and 7 for digital recording and monitoring.

Referring now to FIG. 11, functioning of the system in station eight will be described. Station eight is the station at which actual patient information is recorded. As may be recalled, this information is received from the electrodes attached to the patient 110, passed through the switch 112 and pre-amplifier 118. The output of the pre-amplifier 118 is joined by the 16th calibrated signal and the 16 signals form the input to the analog multiplexer 124. The analog multiplexer is controlled by the first four bits of the 20 bit counter 126. The output of the analog multiplexer is fed to the wide band amplifier 122 from whence a signal is continuously sent to the A/D converter 132. There is no output from the converter 132 excepting as this converter is actuated in station eight.

When the programmer is sequenced to station eight, it causes the high speed line generator 198 to be energized. The high speed line generator 198, in turn, actuates the recorder 146 to cause the recorder to assume the high speed write condition. There is, of course, a time delay during which the recorder accelerates up to the high speed condition. It is not desired to record patient information while the recorder is accelerating to its high speed condition. Therefore, means are provided to prevent patient information from the converter 132 from being recorded during this period. In one embodiment, the actual time consumed in this acceleration process is 22 milliseconds. As previously mentioned, the busy reset pulse from the recorder 146 is used to control the counter 126 during recording of patient information. This pulse is passed through the busy reset pulse delay 186 prior to being fed to the counter 126 for purposes of synchronization. This results in multiplexing the incoming signals and feeding these signals to the wide band amplification stage and thence to the converter 132. The converter 132 will start a conversion when it receives a multiplexed signal along with a signal from the busy reset. The signal from the busy reset is delayed for a very short period of time, several microseconds, by the delay circuit 192 to permit synchronization with the recorder storage event.

A lead 193 extends from the busy reset lead 188 to the input of the step-line function generator 196. The programmer energizes the high speed function generator 198 at station eight. The generator 198 in turn energizes the recorder 146 to begin accelerating to the high speed condition. The signal is also fed to the step-line function generator 196. This signal will cause the step-line function generator, after a delay of 22 milliseconds caused by a time delay mechanism therein, to permit the busy reset signal being received to be transmitted to the recorder 146 to start the recorder writing in the desired fashion. At this point in time, information will be recorded.

The first information recorded is a group of gain identification bytes. This group of gain identification bytes is obtained by energization of the gain identification logic circuit 202. This circuit 202 is energized by the generator 196 for a short period of time. The output of the circuit 202 is fed to the inhibit gate 138 causing this gate to feed a signal to the negative saturate byte generator 134 which will inhibit the generator in the process of generating negative saturate bytes for about 10 negative saturate byte periods. The negative saturate byte occurs in place of the 16th channel. When it is thus inhibited the 16th channel appears for 10 bytes providing a reference voltage level from the pre-amplifier. At the termination of the gain identification group, which may be, for example, ten bytes, the circuit 202 ceases to function as a result of an internal time delay.

Multiplexed electrode information is recorded following termination of the previously mentioned 22 millisecond delay. Such recording occurs even during insertion of gain identification bytes since these bytes occur only on the 16th multiplexed channel.

As the counter counts, a signal from each one of the fifteen leads is consecutively multiplexed, amplified in the wide band amplifier 122 and sent to the converter 132. The magnitude of each of these signals is measured in the converter and digitized. The output passes through the generator 134 and is recorded in the recorder 146. The counter 126 provides a signal to the sixteenth channel generator 136 every sixteenth count. This signal passes through the inhibit gate 138 to the negative saturate byte generator 134 and overrides the signal received from the converter 132 to provide an output which is a negative saturate byte. Consequently, every sixteenth piece of information which is recorded is a negative saturate byte. This byte is later used as a reference signal in the decoding operation.

Each block of heart information contains 32,600 bytes. This encompasses the period of about two heart beats. At the termination of each block of information, a signal is received from the 16th bit of the counter via lead 195 to the step-line function generator 196. This signal causes the step-line function generator to again prevent stepping signals from the busy reset entering the recorder 146 thus discontinuing writing of the recorder and introducing a gap. The same signal applied to the step-line function generator is also supplied to the high speed parity command system via lead 177 which, at this time, causes recording of LRC and CRC bytes generated by the recorder. A time delay is provided in the step-line function generator of thirty milliseconds. Following the delay the step line is opened and the step-line function generator again permits stepping of the recorder. Subsequently, a second gain identification group is introduced and following that, a second block of patient information is introduced and recorded. When the 17th bit of the counter falls, a signal is received via lead 199 by the high speed generator causing this generator to de-energize the recorder in the high speed write position after a time delay of 20 milliseconds. The same signal is received by the step-line function generator causing this generator to immediately cease stepping of the recorder. The signal from the step-line function generator is fed to the high speed parity command system which, at this time, causes recording of the LRC and CRC bytes generated by the recorder. After the introduction of these bytes and a twenty millisecond delay, the recorder decelerates and stops. At this point, the high speed write mode is terminated and the programmer is then sequenced to the ninth station which has previously been described. During the high speed write mode, the overall system provided means for simultaneously monitoring the data being recorded.

Figure 12:
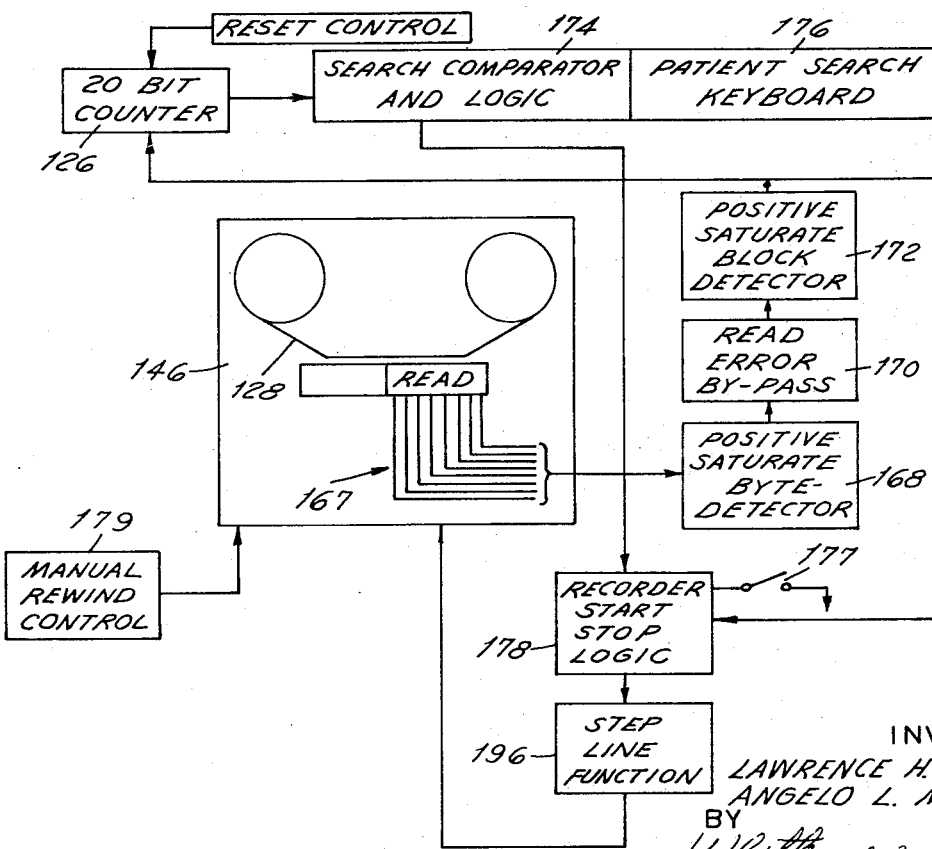
FIG. 12 is a block diagram illustrating utilization of the system of FIGS. 6 and 7 for search of recorded data.

Referring to FIG. 12, the connections at station ten may be observed. Station ten permits location of a particular patient record. When it is desired to locate a patient record, the recorder 146 is caused to rewind the tape 228 to the initial or zero position by means of manual control 179. The 20 bit counter is reset to zero count by the programmer at the initiation of station 10. The data concerning each patient is assigned a number when that information is recorded. This number is manually inserted into the patient search keyboard circuit 176. The circuit 176 is integrated with the search comparator and logic circuit 174.

When the tape has been rewound and the patient number inserted, the system is ready to begin the search for the particular patient record which is sought. Initiation of the search is made by means of depressing a switch 177 which is connected to ground. Closure of this switch functions to cause the recorder start-stop logic circuit 178 to emit a signal to the high speed line generator causing the recorder to move at high speed. When the switch 177 is released the recorder continues to operate in high speed read mode. True positive saturate blocks are detected at 172 and fed to the counter 126. The selected patient binary number on the patient search keyboard 176 is compared with the positive saturate block count appearing on the bits of the 20 bit counter 126 in the search comparator and logic 174. When these two binary numbers are equal the number of saturate blocks that have passed equals the desired patient number. This is identified by giving the circuit 178 a change of level that removes the high speed read command from the recorder. Circuit 180 will cause the recorder 146 to stop in the saturate block of the patient selected.

Figure 13:
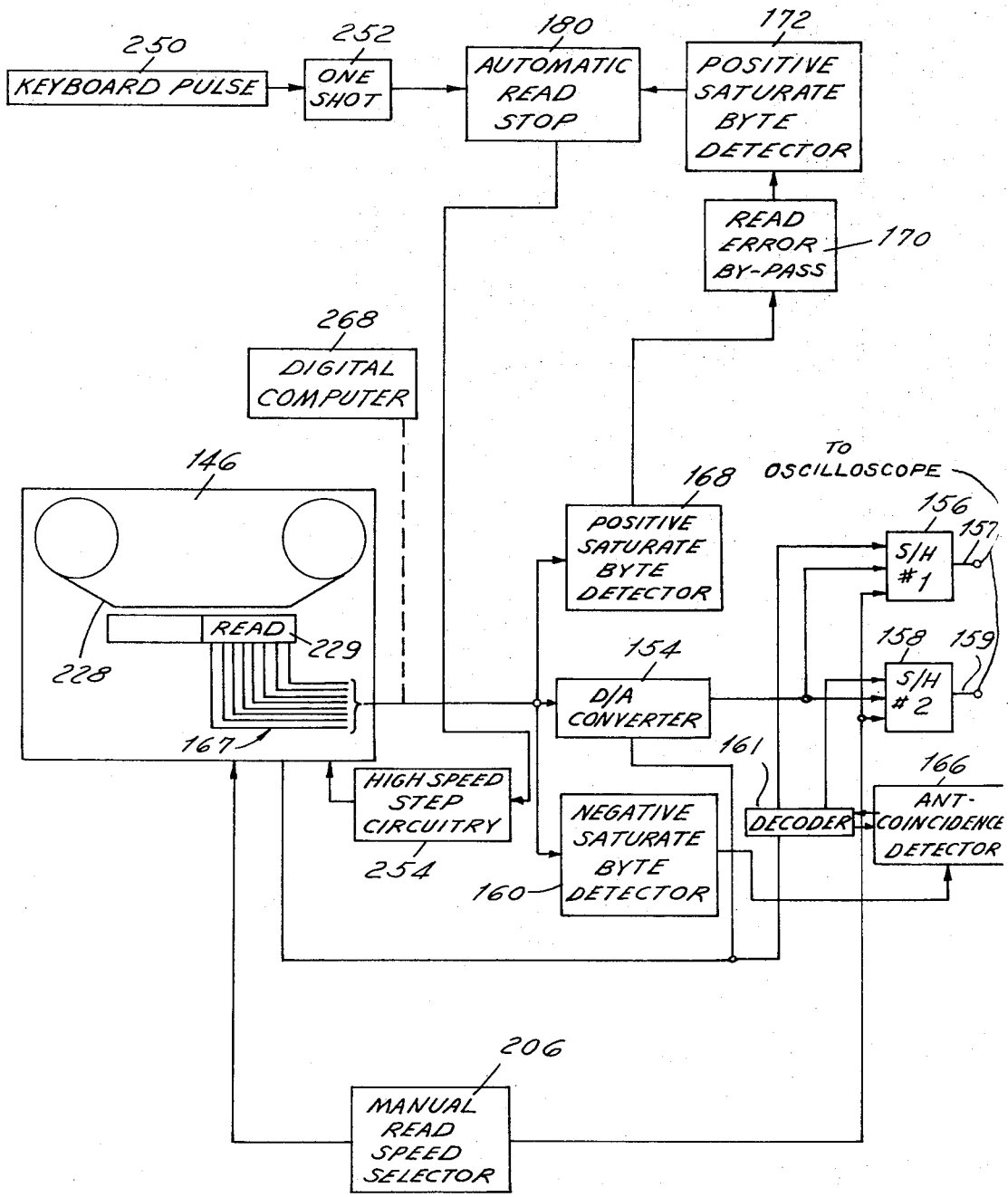
FIG. 13 is a block diagram illustrating utilization of the system of FIGS. 6 and 7 for reading of the recorded data.

After the proper patient record has been located, the programmer is sequenced to the final station, station eleven. The connections made at station eleven are illustrated in FIG. 13. These connections permit reading of the patient's record.

Means are provided for limiting advance of the tape so that only the record of the patient of interest will be read. These means include an automatic read-stop circuit 180 and the previously described positive saturate byte detector 172 and high speed circuitry 254. The high speed circuitry 254 includes the means described in connection with station eight (FIG. 11) to provide high speed step commands to the recorder 146. The recorder may be operated in forward or reverse directions by means of a selector switch (not shown).

The automatic read-stop circuit 180 is energized when it is desired to begin initiation of the read-out. The means for energization include a manually depressible key 250 on the previously described keyboard which, when depressed, will emit a pulse to a one-shot multi-vibrator 252 which in turn will feed this pulse to the automatic read-stop circuit 180 and energize this circuit which in turn will energize a high speed level in circuit 254 to cause the recorder to begin high speed operation. When the next positive saturate block is received, which means the beginning of the next patient's record, a signal will be sent by the positive saturate byte detector to the automatic read-stop circuit to cause cessation of energization of the circuit and cessation of high speed operation of the recorder.

The means for reading the information which has been located includes, as previously described, a decoder 161. The decoder 161 is basically a switching circuit which permits directing each byte of information to an output which nominally corresponds to the number assigned to that byte of information. The decoder 161 has 16 time sequenced pulse outputs which correspond to the 15 electrode signals and the negative saturate byte. A clock pulse is sent from the recorder 146 to both the decoder 161 and the D/A converter 154 in order that the outputs of these circuits will be in synchronism. Any two outputs of the decoder may be manually wired into the sample hold circuits 156, 158 at a given time. If the person examining the patient's record wishes to examine all fifteen of the signals, he successively connects different outputs to the sample hold circuits until he has examined all fifteen. Two patient leads are displayed while reading in the forward direction over the recorded data and two different patient leads are displayed in reading over the patient data in the reverse direction. Reversing of the recorder is done manually.

The decoder 161 includes sixteen addresses. The clock pulse received from the recorder 146 causes the decoder to more from address to address by means of a four-bit counter 163. Thus a pulse out of the decoder will be available in sequence with the proper patient electrode at the output of the recorder, but only those output lines of the decoder which are connected to the sample hold circuits will be transmitted through the sample and hold.

The anti-coincidence detector 166 comprises a logic circuit which will reset the decoder to the start-count position upon the occurrence of any of three different events. The first event is when the sixteenth channel on the decoder is reached. This channel is directly connected to the detector 166 and each time the decoder counts to sixteen, a signal is fed to the detector which causes the decoder to be reset at the start-count position. Normally, when the decoder counts to 16, a negative saturate byte will also be fed to the detector 166. If such a byte is received by the detector 166 at the 16th count, the decoder will be reset. However, the decoder will be reset at the sixteenth count regardless of whether or not a negative saturate byte is received. If a negative saturate byte is received at some point other than the 16th count, the detector 166 will also cause the decoder 161 to be reset. Consequently, if the portion of the recorded material is garbled so that the total number of bytes for a single signal contains more or less than 16 bytes or if a negative saturate byte inadvertently occurs in the middle of a 16 byte block of information, the recorder will be reset. Such resetting will continue to occur until such time as a proper 16 byte sequence of information is received.

The converter 154 receives the data from the recorder 146 and continuously converts the binary coded data into an analog signal. The output of the converter represents a repeating sequence of the 16 bytes which form a block representing one complete signal scan. The decoder output is provided to the sample hold circuits to permit these circuits to act upon only the particular electrode which it is desired to monitor. Simultaneous reception by the sample hold circuits of a signal from the decoder and a signal from the converter will cause these circuits to pass for display the signal of interest. All other signals are blocked. The sample hold circuits will hold the signal which is passed for display purposes for a length of time equal to the time it takes to receive the succeeding signal of interest. The signal held by the sample hold circuits may be taken from the outputs 157, 159 and displayed on an oscilloscope or permanently recorded by means of a pen recorder. If a pen recorder is used, it may be connected to the automatic read-stop circuit 180 so that it will automatically cease functioning when the information has been read. This is a paper saving device after termination of reading both patient blocks of information. The sample hold circuits may be modified by adding or subtracting capacitance to facilitate slow or fast reading. This is accomplished via the manual read speed selector and manual high speed write circuit.

The above described read circuitry will, of course, only display the information as a body surface potential which may be roughly correlated to heart activity. The information which was recorded may also, and preferably is, examined by means of a digital computer in a more refined fashion to permit a more accurate diagnosis. Referring to FIG. 3, it will be noted that each electrode is placed in the thorax area of the body, that is, the part of the body between the neck and the abdomen. It will be noted that only five leads are placed on the patient's back while ten leads are placed on the patient's front. The reason for this is that the front contains more information than the back thus needing more sampling. The two-to-one ratio is preferred. Each electrode is placed in a position where it will receive significant signals from a particular portion of the heart 258 as indicated generally by the dotted lines which extend from the electrodes. Of course, the signal received by each electrode will at all times contain components of all signals emitted from the heart. However, when the particular portion of the heart which a specific electrode is correlated with is electrically active, then the signal received by that particular electrode will contain a major component of that particular area. Such electrical activity occurs when the area of interest is electrically active, that is, when that portion of the heart muscle is depolarizing or repolarizing.

The information from all of the electrodes is weighted in terms of the input-output geometry involved. This information has been reduced to data sets with respect to the particular electrode location shown in FIGS. 1 and 2. For example, a data set identified as "Transformation Arrays No. 2, No. 3 and No. 4 for High Resolution Electrocardiography" by Lawrence H. Krohn, M.D., published in 1970, provides the necessary information to permit a digital analysis. The data set, when utilized in a computer 268 (FIG. 13) which may be remotely located, accomplishes the weighting of the signals and conversion of the signals from potentials to current densities.

Figure 5:
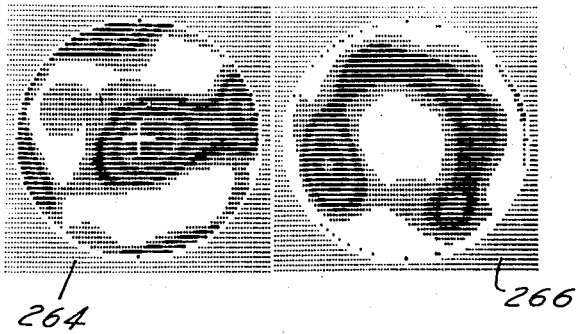
FIG. 5 is a current density diagram illustrating functioning of an abnormal heart.

A typical seven level current density diagram obtained by this method is illustrated in FIGS. 4 and 5. The current density diagram shown in FIG. 4 illustrates the anterior 260 and posterior 262 activity of a normal heart at a particular instant. FIG. 5 shows a seven level current density diagram of anterior 264 and posterior 266 activity of the heart illustrating functioning of an abnormal heart at the same instant, specifically, a heart pattern indicating coronary arteriosclerosis. These views summarize the total outgoing current flow projected from the anterior and posterior hemispheres of an imaginary sphere 261 onto a flat surface from each geometric point on the advancing wave front of the heart summed over, for example, a portion of the QRS interval. The points between the actual electrodes are obtained by employment of the transformation arrays. The diagram represents 90 eight bit bytes. A positive direct current impulse pattern is shown. The FIG. 5 diagram shows a pattern resulting from total obstruction of the left anterior descending coronary artery with collateral compensation by the right coronary artery. Comparison of the two sets of diagrams will indicate that in the healthy heart, the wave front is advancing in a regular concentric pattern whereas in the damaged heart, the wave pattern is distorted and not regular. The same type of diagnosis may be made for other portions of the heart. Usually, a small number of pictures of the many available may be studied and will result in a substantially thorough examination of the heart. The heart information in the specific embodiment illustrated is of 80 milliseconds duration. Each of the diagrams is one millisecond long and divided into seven amplitude fractions. Thus eighty pictures are available. The comparator means may be visual as shown or incorporated into the computer.

As previously mentioned, contraction and relaxation of muscle tissue are preceded by electrical activity associated with movement of ions across cell membranes. Because body tissue conducts electricity, these cellular forces produce currents throughout the body. Potential differences of the order of millivolts can be detected at the body surface from the action of the heart muscle. The electrocardiogram of the present invention is derived from these potential differences which arise in conjunction with the beating of the heart.

The cardiac cycle in the normal heart is initiated at an anatomically localized pacemaker focus, the sinoatrial node. At this node, the heart rate is determined by the intrinsic periodicity of the tissue under the combined control of biochemical, biomechanical, and neurological influences. Once initiated, the excitation progresses through the tissues of the normal heart in an orderly fashion and is followed by a recovery process in the individual muscle fibers. This sequence of activity determines the pattern of the signals received and recorded by the mechanism of the invention.

The wave form associated with the heart cycle has been divided into several generally recognized portions. The first portion is the P wave which is associated with the atrial activity. The next portion, and the portion which is of particular interest in diagnosis, is the QRS complex which relates to ventricular excitation. The final portion is referred to as the T wave. This wave relates to the electrical signals emanated during the recovery process of the ventricle. In the QRS complex, the Q designation is ordinarily utilized in connection with identifying the initial negative component after the P wave. The R is utilized to identify the first positive component after the P wave. The S is utilized to identify a negative deflection preceding the T wave. There are durations between the waves. The P wave usually lasts for about 0.15 second, the QRS complex lasts for slightly less than 0.1 second, and the T wave lasts for about 0.2 seconds, totaling about 0.45 seconds. The interval between the end of the P wave and the beginning of the QRS complex is about 0.1 second. The entire cycle lasts for less than 1 second. Any restricted segment may be individually analyzed.

The nature of the electrical activity of the heart should be understood in order to appreciate the nature of the information which has been recorded by the mechanism of the present invention. The heart muscle is the fibrous tissue made up of small cylindrical contractile elements lying mostly parallel to one another in a given region and parallel in general to the surface of the heart. Each fiber is many diameters in length and is cross-striated similarly to voluntary muscle. Heart muscle is not voluntary muscle and does not include detailed direct-acting nerve control. Each fiber depends for its excitation mainly upon interaction with adjacent muscle fibers with which it is firmly interconnected histologically by virtue of extensive branching. Excitation spreads from fiber to fiber and is believed to be guided largely by Purkinje muscle fibers which are specialized to serve this stimulus-conducting function. The fibers do not have a directionally selective excitation mechanism with the result that excitation started at one place in the heart can spread to other adjacent regions if they are in an excitable state. Consequently, the heart can be fired quickly and in an orderly predetermined pattern.

The interior of each fiber is negatively polarized with respect to the exterior when the fiber is at rest. During excitation the potential difference across the thin membranes surrounding the fiber undergoes a characteristic pattern of change. During excitation, ions, principally sodium and potassium, are transferred across this membrane. A reversal of polarity occurs, the inside becoming positive. It again becomes negative when returned to the at rest condition. The sequence of excitation of the myocardium, propagation through specialized tissue in the bundle of HIS, and the spreading through the septum and the ventricular mass is known. This information is utilized by the physician in locating the portion of a heart derived from a particular body of information recorded by the mechanism of the present invention as a function of time.

In analyzing the voltage information recorded by the mechanism of the present invention, the potentials which have been recorded are transformed to the corresponding current density. This may be done reasonably accurately because for the current density produced by the heart, surrounding tissues may be considered linear with the potential gradient everywhere being proportional to the current density. This constant of proportionality between electrical field and current density represents resistivity of the tissue. This is particularly true of bulk thoracic tissues with the result that the chest may be considered as resistive.

Consequently, the digital computer 268 may be preset with respect to the time intervals of discrete portions of the recorded data and with respect to the correlative geometrical locations of the electrodes and with respect to the resistivity of the body parts between the electrodes and the heart to convert the voltage representations to current density representations.

Many of the component circuits of the invention may be standard off-the-shelf items. For example, the decoder 161 may be a Fairchild Decoder Model No. U6N 9311 59X, the multiplexer 124 may comprise a pair of Fairchild Semi-Conductor MOS Monolithic 8-channel Multiplex Switches A6J 3705 142, the pre-amplifier 118 may be composed of a plurality of two-stage Fairchild Semi-conductor Operational Amplifier MU A 741, the analog-to-digital converter may be the Redcor Company Analog to Digital Converter Model No. 770 750, the keyboard system 148 may be a product of Micro-Switch, a Division of Minneapolis-Honeywell Company, Solid State Keyboard, 51 keys Type SSK and the recorder 146 may be a Precision Instrument Company Digital Tape Recorder Model 1209.

Figure 14:
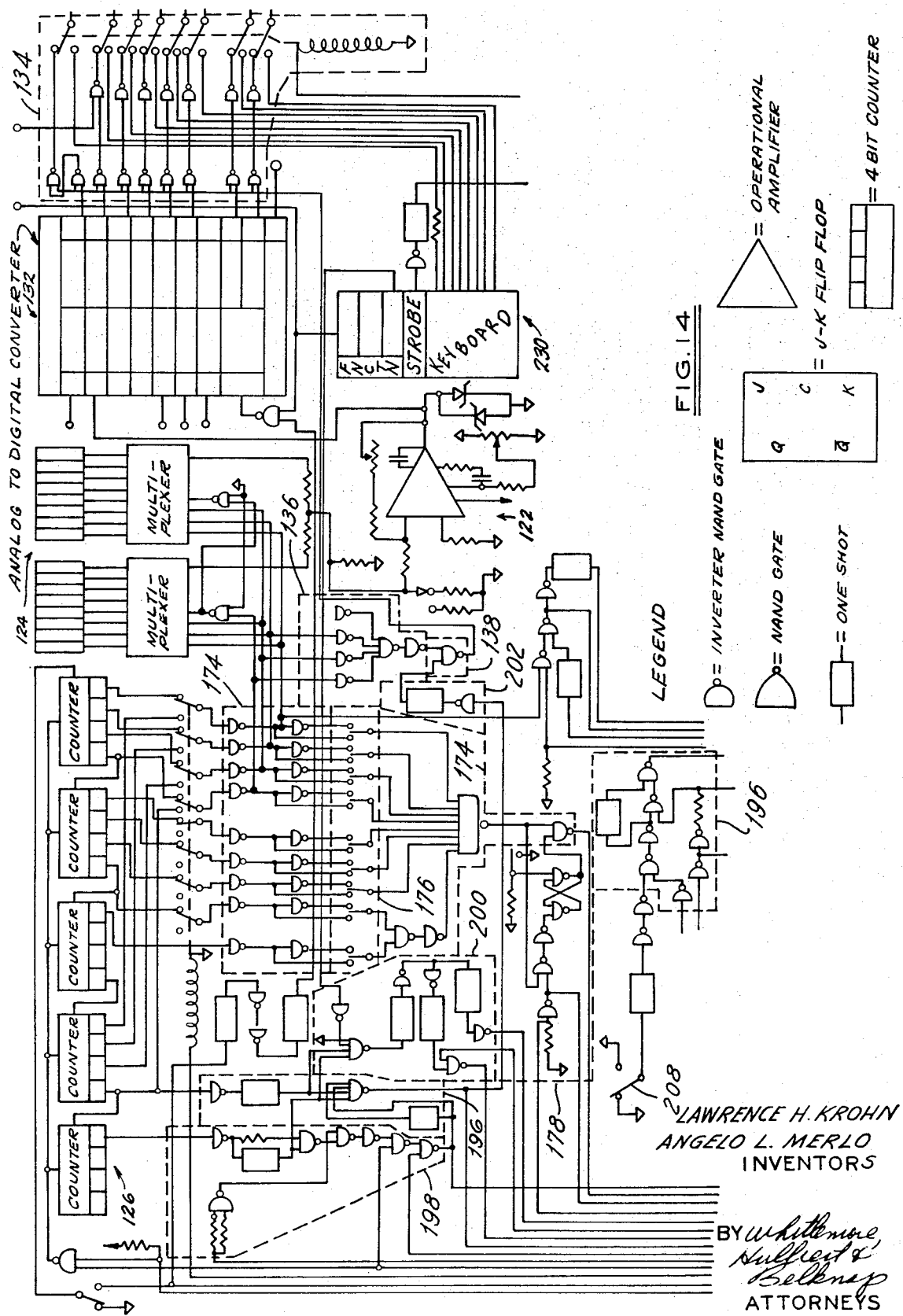
Figure 15:
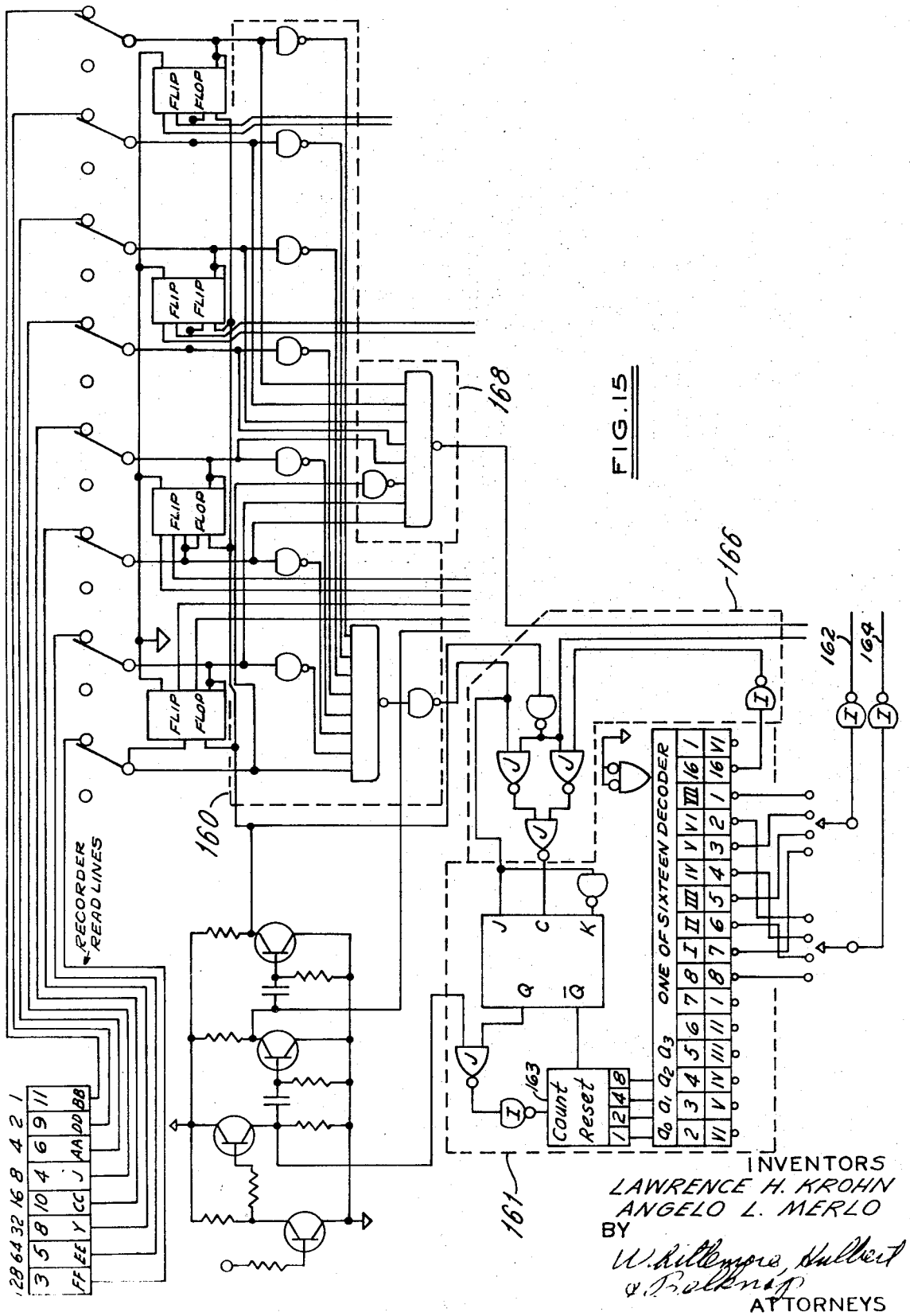

Exemplary specific circuitry for the remaining non-conventional portions of the circuit are illustrated in FIGS. 14–16. Referring to FIG. 14, it will be noted that the various specific circuits are outlined in dotted lines with the proper numeral notation made in connection therewith. FIG. 14 illustrates a typical circuitry for the high speed function generator 198, the step line function generator 196 (which is located physically at two different locations), the recorder start-stop logic 178, the manual control station selector 208, the high speed parity command system 200, the search comparator and logic circuit 174 (which is physically located at two different locations), the patient search keyboard 176, the 16th channel generator 136, the gain identification logic 202, the inhibit gate 138 and the negative saturate byte generator 134.

FIG. 15 illustrates the negative saturate byte detector 160, the positive saturate byte detector 168, the decoder circuit 161, and the anti-coincidence detector circuit 166.

FIG. 16 illustrates the read bypass circuit 170, the positive saturate block detector circuit 172, the automatic read-stop 180 and one sample hold circuit 156.

From the previous description, the specific operational characteristics of these circuits may be easily understood by following the various connections. It should be appreciated, however, that other circuitry may be substituted as desired to perform the sought after functions.

What we claim as our invention is:

1. A system for providing a multi-level current density diagram of a human body organ for the purpose of medical diagnosis comprising:

a. means for attaching a plurality of electrodes to a patient's body in positions around the organ to detect continuous analog-type voltage signals resulting from electrical energy generated by the organ in the course of its functioning;
    b. digital converting and recording apparatus connected to the electrodes, said apparatus including means to multiplex a discrete portion of said signals, means to convert the multiplexed portion into digital form representing the magnitude thereof, and means to record the signals in digital form;
    c. digital computer means to convert the recorded digital data into a series of multi-level current density diagrams, said computer being preset with respect to the time intervals of discrete portions of the recorded data and with respect to the correlative geometrical locations of the electrodes and with respect to the resistivity of the body parts between the electrodes and the organ to convert the voltage representations to current density representations.

2. A system as defined in claim 1, further characterized in that the human body organ is the heart, said electrodes being attached at discrete locations over a band of surface area on the front and back of the thorax of a patient.

3. A system as defined in claim 2, further characterized in that more electrodes are provided for attachment to the front of a patient than are provided for attachment on the back of a patient.

4. A system in defined in claim 3, further characterized in that the ratio is substantially two-to-one of electrodes for the front as compared with the electrodes for the back.

5. A system as defined in claim 4, further characterized in that ten electrodes are provided for the front and five electrodes are provided for the back.

6. A system as defined in claim 2, further characterized in that said means to multiplex a discrete portion of said signals includes means to selectively multiplex at least two heart beats.

7. A system as defined in claim 6, further characterized in that said discrete multiplexed portion comprises four intervals corresponding to four heart beats of a patient.

8. A system as defined in claim 6, further characterized in that said digital computer means includes means to print out a series of said multi-level current density diagrams corresponding to one heart beat.

9. A system for providing a multi-level current density diagram of a human body organ for the purpose of medical diagnosis comprising:

a. a plurality of electrodes, means for attaching said plurality of electrodes to a patient's body in positions around the organ to detect continuous analog-type voltage signals resulting from electrical energy generated by the organ in the course of its functioning;
    b. digital converting and recording apparatus connected to the electrodes, said apparatus including means to multiplex a discrete portion of said signals, means to convert the multiplexed portion into digital form representing the magnitude thereof, and means to record the signals in digital form; means to add an arbitrary signal to the signals received from said electrodes, said means to multiplex including means to multiplex the arbitrary signal after each multiplexing of the electrode signals, said means to multiplex including counter means, said counter means including means to emit a separate signal at the termination of multiplexing of each set of electrode signals, negative saturate byte generator means connected to the output of said means to convert, said generator means including means to pass all the converted signals from the electrodes, means connecting said generator means to said counter means to receive said separate signal from the counter means, and means in said generator means to override the negative saturate byte signal and emit said arbitrary signal upon reception of said separate signal from the counter;

c. digital computer means to convert the recorded digital data into a series of multi-level current density diagrams, said computer being preset with respect to the time intervals of discrete portions of the recorded data and with respect to the correlative geometrical locations of the electrodes and with respect to the resistivity of the body parts between the electrodes and the organ to convert the voltage representations to current density representations; and d. comparator means for comparing the diagrams with diagrams of normal organ functioning for medical diagnosis thereof.

10. A system as defined in claim 11 further characterized in the provision of digital to analog converter means operative to convert the digital information of the recording apparatus to analog information for displaying this information in analog fashion, said programmer being operative in one position to interconnect the output of the recorder to the input of the digital to analog converter means.

11. A system as defined in claim 10, further characterized in that said digital to analog converter means includes means for utilizing said recorded negative saturate byte for individually displaying the signal from each electrode.

12. A system as defined in claim 11, further characterized in that said digital to analog converter means includes means for extending the time of display of each signal beyond its normal length of time.

13. A system for providing a multi-level current density diagram of a human body organ for the purpose of medical diagnosis comprising:

a. a plurality of electrodes, means for attaching said plurality of electrodes to a patient's body in positions around the organ to detect continuous analog-type voltage signals resulting from electrical energy generated by the organ in the course of its functioning;

b. digital converting and recording apparatus connected to the electrodes, said apparatus including means to multiplex a discrete portion of said signals, means to convert the multiplexed portion into digital form representing the magnitude thereof, and means to record the signals in digital form; a hard-wire programmer for interconnecting various components of the digital converting and recording apparatus, said programmer including means for connecting said apparatus in a plurality of different configurations, one of said configurations being a high speed write condition wherein the output of the converter is connected to the input of a digital recorder forming part of the means to record for digital recording of said discrete portion of said signals, said means to multiplex including a multi-bit counter for control thereof, said means to record including means for providing a stepping signal correlated to the speed of recording, said recorder including means to receive said stepping signal and cause information to be recorded only when said stepping signal is received, step-line function generator means operably connected to said stepping signal means to control feeding of the stepping signal to the recorder, the output of one bit of said counter being operably connected to said step-line function generator means to cause said generator means to prevent said stepping signal means from feeding a stepping signal to the recorder upon the fall of said one bit, said one bit being selected to fall at the termination of recording of said discrete portion of said signals;

c. digital computer means to convert the recorded digital data into a series of multi-level current density diagrams, said computer being preset with respect to the time intervals of discrete portions of the recorded data and with respect to the correlative geometrical locations of the electrodes and with respect to the resistivity of the body parts between the electrodes and the organ to convert the voltage representations to current density representations; and d. comparator means for comparing the diagrams with diagrams of normal organ functioning for medical diagnosis thereof.

14. A system as defined in claim 13, further characterized in the provision of time delay means operably connected to said step-line function generator means to cause said generator means to prevent feeding of the stepping signal to the recorder for a time interval at the initiation of recording sufficient to allow the recorder to mechanically accelerate to the high speed write condition.

15. A system as defined in claim 13, further characterized in the provision of an oscilloscope, wide band amplifier means connected to the output of said multiplexing means, said programmer including at least one position in which the output of the wide band amplifier is connected to the oscilloscope to permit visual examinations of the character of the electrode outputs to assure proper connections having been made with a patient.

16. A system as defined in claim 15, further characterized in the provision of an astable multi-vibrator, means for connecting the output of said vibrator to said counter to control the counter, said programmer connecting the output of the multi-vibrator to the counter in said one position.

17. A system as defined in claim 16, further characterized in means operably connected to said multi-vibrator to control the pulse rate thereof and thereby permit control of the time which the outputs of the leads are displayed on the oscilloscope.

18. A system as defined in claim 17, further characterized in that said multi-vibrator control means includes one position which will cause stopping of counting thereby permitting indefinite display of a particular electrode output on the oscilloscope.

19. A system as defined in claim 13, further characterized in the provision of manual recording means for recording patient information, said programmer being operative in one position to interconnect said manual recording means and the recorder to permit insertion of patient information.

20. A system as defined in claim 19, further characterized in the provision of parity mark insertion means, said programmer being operative in other positions to interconnect the manual recording means, the parity mark insertion means, and the recorder to permit manual recording of parity marks.

21. A system as defined in claim 19, further characterized in the provision of positive saturate block generator means operatively connectible to one output of said manual recorder means to cause said one output to be a series of positive saturate bytes when said manual recorder means is manually set to produce said one output, means to cause said recorder to record a predetermined number of bytes emanating from said manual recorder means, said programmer being operative in one position to simultaneously interconnect said last mentioned means and said one output of the recorder to thereby record a block of a predetermined number of positive saturate bytes.

22. A system as defined in claim 21, further characterized in the provision of search comparator and logic means connectible to the output of the recorder, manual patient search keyboard means integrated with said logic means, said keyboard means being manually settable to a particular number corresponding to the location of a particular positive saturate byte block on a recording which includes a plurality of such blocks, said logic circuit and keyboard circuit being integrated to emit a signal when the particular number has been reached upon energization of the recorder to cause recorder output, said signal being connectible to the recorder, said recorder including stop means to cause de-energization thereof upon reception of said signal, said programmer being operative in one position to cause interconnection of said components.

23. A system as defined in claim 13, further characterized in the provision of high speed line generator means operably connected to said recorder to cause starting and stopping of said recorder, said high speed line generator being operative to supply a signal to start the recorder when connected thereto by the programmer, the output of another bit of said counter being operably connected to said high speed line generator means to cause the generator means to re-activate the recorder upon the fall of said other bit, said other bit being selected to fall at the termination of recording of all discrete portions of said signals which it is desired to record.

24. A system for digitally recording analog-type voltage signals of a human body organ for the purpose of medical diagnosis comprising:
 a. a plurality of electrodes, means for attaching said plurality of electrodes to a patient's body in positions around the organ to detect continuous analog-type voltage signals resulting from electrical energy generated by the organ in the course of its functioning;
 b. digital converting and recording apparatus connected to the electrodes, said apparatus including means to multiplex a discrete portion of said signals, means to convert the multiplexed portion into digital form representing the magnitude thereof, and means to record signals in digital form; means to add an arbitrary signal to the signals received from said electrodes, said means to multiplex including means to multiplex the arbitrary signal after each multiplexing of the electrode signals, said means to multiplex including counter means, said counter means including means to emit a separate signal at the termination of multiplexing of each set of electrode signals, negative saturate byte generator means connected to the output of said means to convert, said generator means including means to pass all the converted signals from the electrodes, means connecting said generator means to said counter means to receive said separate signal from the counter means, and means in said generator means to override the negative saturate byte signal and emit said arbitrary signal upon reception of said separate signal from the counter.

25. A system as defined in claim 24, further characterized in display means connectible to the output of the recording apparatus and operative to convert the digital information of the recording apparatus to analog information and display this information in analog fashion, said programmer being operative in one position to interconnect the output of the recorder to the input of the display means.

26. A system as defined in claim 25, further characterized in that said display means includes means for utilizing said recorded negative saturate byte for individually displaying the signal from each electrode.

27. A system as defined in claim 26, further characterized in that said display means includes means for extending the time of display of each signal beyond its normal length of time.

28. A system for digitally recording analog-type voltage signals of a human body organ for the purpose of medical diagnosis comprising:
 a. a plurality of electrodes, means for attaching said plurality of electrodes to a patient's body in positions around the organ to detect continuous analog-type voltage signals resulting from electrical energy generated by the organ in the course of its functioning;
 b. digital converting and recording apparatus connected to the electrodes, said apparatus including means to multiplex a discrete portion of said signals, means to convert the multiplexed portion into digital form representing the magnitude thereof, and means to record signals in digital form, a hard-wire programmer for interconnecting various components of the digital converting and recording apparatus, said programmer including means for connecting said apparatus in a plurality of different configurations, one of said configurations being a high speed write condition wherein the output of the converter is connected to the input of a digital recorder forming part of the means to record for digital recording of said discrete portion of said signals, said means to multiplex including a multi-bit counter for control thereof, said means to record including means for providing a stepping signal correlated to the speed of recording, said recorder including means to receive said stepping signal and cause information to be recorded only when said stepping signal is received, step-line function generator means operably connected to said stepping signal means to control feeding of the stepping signal to the recorder, the output of one bit of said counter being operably connected to said step-line function generator means to cause said generator means to prevent said stepping signal means from feeding a stepping signal to the recorder upon the fall of said one bit, said one bit being selected to fall at the termination of recording of said discrete portion of said signals.

29. A system as defined in claim 28, further characterized in that the human body organ is the heart, said electrodes being attachable at discrete portions on the front and back of the thorax of a patient.

30. A system as defined in claim 29, further characterized in that said means to multiplex a discrete portion of said signals include means to selectively multiplex at least two heart beats.

31. A system as defined in claim 28, further characterized in the provision of manual recording means for recording patient information, said programmer being operative in one position to interconnect said manual recording means and the recorder to permit insertion of patient information.

32. A system as defined in claim 31, further characterized in the provision of positive saturate block generator means operatively connectible to one output of said manual recorder means to cause said one output to be a series of positive saturate bytes when said manual recorder means is manually set to produce said one output, means to cause said recorder to record a predetermined number of bytes emanating from said manual recorder means, said programmer being operative in one position to simultaneously interconnect said last mentioned means and said one output of the recorder to thereby record a block of a predetermined number of positive saturate bytes.

33. A system as defined in claim 32, further characterized in the provision of search comparator and logic means connectible to the output of the recorder, manual patient search keyboard means integrated with said logic means, said keyboard means being manually settable to a particular number corresponding to the location of a particular positive saturate byte block on a recording which includes a plurality of such blocks, said logic circuit and keyboard circuit being integrated to emit a signal when the particular number has been reached upon energization of the recorder to cause recorder output, said signal being connectible to the recorder, said recorder including stop means to cause de-energization thereof upon reception of said signal, said programmer being operative in one position to cause interconnection of said components.

34. A system as defined in claim 28, further characterized in the provision of high speed line generator means operably connected to said recorder to cause starting and stopping of said recorder, said high speed line generator being operative to supply a signal to start the recorder when connected thereto by the programmer, the output of another bit of said counter being operably connected to said high speed line generator means to cause the generator means to re-activate the recorder upon the fall of said other bit, said other bit being selected to fall at the termination of recording of all discrete portions of said signals which it is desired to record.

* * * * *

UNITED STATES PATENT OFFICE
CERTIFICATE OF CORRECTION

Patent No. 3,717,141    Dated February 20, 1973

Inventor(s) LAWRENCE H. KROHN and ANGELO L. MERLO

It is certified that error appears in the above-identified patent and that said Letters Patent are hereby corrected as shown below:

Column 11, line 7 of patent
cancel "This" and substitute --The--.

Column 19, line 32 of patent (Claim 10, line 1),
         cancel "11" and substitute --9--.

Column 20, line 54 of patent (Claim 15, line 7),
         cancel "examinations" and substitute
--examination--.

Signed and sealed this 7th day of May 1974.

(SEAL)
Attest:

EDWARD M. FLETCHER, JR.                C. MARSHALL DANN
Attesting Officer                      Commissioner of Patents